United States Patent [19]

Hecht et al.

[11] Patent Number: 5,039,643

[45] Date of Patent: Aug. 13, 1991

[54] METHOD FOR THE PRODUCTION OF CATALYTICALLY ACTIVE COATINGS FOR THE PRODUCTION OF HYDROGEN CYANIDE

[75] Inventors: Christian Hecht, Frankfurt Am Main; Peter Panster, Rodenbach; Friedrich Bittner, Bad Soden; Petra Look-Herber, Braunschweig, all of Fed. Rep. of Germany

[73] Assignee: Degussa Aktiengesellschaft, Fed. Rep. of Germany

[21] Appl. No.: 550,746

[22] Filed: Jul. 10, 1990

[30] Foreign Application Priority Data

Jul. 13, 1989 [DE] Fed. Rep. of Germany ....... 3923034

[51] Int. Cl.$^5$ .......................... B01J 27/24; C01C 3/02
[52] U.S. Cl. .................... 502/200; 423/376; 502/173
[58] Field of Search ................ 502/400, 173; 423/376

[56]     References Cited
U.S. PATENT DOCUMENTS 2,768,876 10/1956 Wagner ............................... 423/376
3,112,215 11/1963 Ruosch et al. ..................... 423/376
3,658,471 4/1972 Sperka et al. ....................... 423/376
4,961,914 10/1990 Witzel et al. ........................ 423/376

Primary Examiner—Paul E. Konopka
Attorney, Agent, or Firm—Cushman, Darby & Cushman

[57]     ABSTRACT

A method for the production of catalytically active coatings on shaped articles of aluminum oxide for the production of hydrogen cyanide according to the BMA method. A suspension is used for the coating which suspension contains at least one platinum metal and aluminum in finely divided elementary form in a carrier liquid. According to especially preferred embodiments, the suspension additionally contains glass frits or organic silicon compounds. After the moistening of the shaped article and evaporation of the carrier liquid, the catalyst is formed during heating to 1000° to 1350° C. in the presence of nitrogen and/or ammonia.

Essential advantages of the method over the previously known method of coating with solutions of Pt and Al compounds are: the application of different coating thicknesses are possible in a single coating stage, the previously-necessary hydrogenation stage after each impregnation is eliminated and the health risk is reduced.

26 Claims, No Drawings

METHOD FOR THE PRODUCTION OF CATALYTICALLY ACTIVE COATINGS FOR THE PRODUCTION OF HYDROGEN CYANIDE

The present invention relates to a method for the production of catalytically active coatings on the surfaces of shaped articles or catalyst supports consisting essentially of aluminum oxide which are useful for the production of hydrogen cyanide according to the BMA method. More particularly, the invention relates to a method for making such articles in which the catalytically active layer contains aluminum nitride and at least one platinum metal.

BACKGROUND OF THE INVENTION

According to the so-called BMA method, lower hydrocarbons, especially methane, are reacted with ammonia at temperatures of approximately 1000° to 1350° C. in the presence of a catalyst to form hydrogen cyanide and hydrogen (cf. Ullmann's Encyclopedia of Industrial Chemistry, 5th edition (1987), vol. A8, pp. 162-163). The strongly endothermic reaction normally takes place in tube reactors. The reaction tubes consist essentially of aluminum oxide. They are suspended in a BMA tube reactor and are heated externally. The inner surfaces of the tubes are provided with a catalytically active coating, usually containing platinum.

According to the method of German Patent Application DE-AS 10 13 636, the reaction gases are conducted over catalysts which contain, in addition to one or more platinum metals (especially platinum), aluminum or magnesium in metallic form or as a nitride. A preferred, catalytically active coating of carriers of the shaped articles, which consist essentially of aluminum oxide, contains platinum and aluminum nitride. In order to produce the coating, the shaped articles are impregnated with e.g. aluminum-containing solutions of chloroplatinic acid; after drying, a reduction is carried out at 600°-900° C. with hydrogen; the formation of the nitride takes place in the BMA reactor in the start-up phase, under the influence of the ammonia used for the HCN synthesis. In order to obtain a catalytically active layer which is sufficiently thick for continuous duty—approximately 10 to 30 mg platinum per $cm^2$ surface—, the impregnating and hydrogenating step must generally be repeated several times, as is emphasized in U.S. Pat. No. 3,112,215, because only approximately 2 mg platinum per $cm^2$ coating can be deposited per impregnation process. Thus, the production of the catalytically active coating by this method requires using a large amount of precious metal and high expense.

The previous method was improved in accordance with the disclosure of German Patent Application DE-OS 37 23 535 as regards the use of noble metal. It was found that a catalytic solution having an atomic ratio of noble metal, especially platinum, to aluminum in a range of 0.001-0.1: 1 permits the production of coatings with good catalytic action. However, after the impregnation with a solution containing e.g. metal halides, and after drying, reduction with hydrogen was required. In addition, it proved to be advantageous to carry out the impregnation and the hydrogenation several times in order to obtain coatings having long service life and a high level of performance.

The application of metals from the vapor phase is also known from German Patent DE 10 13 636. In this case, readily decomposable or readily reducible compounds of platinum and aluminum are applied in the presence of reducing gases, e.g. in a flame, while an aluminum-containing platinum coating is precipitated onto the shaped article. This method was not accepted in practice because the production of volatile noble-metal compounds is expensive and the practical problems of depositing a coating on the inner surface of long tubes could not be solved in a satisfactory manner. In addition, multiple coatings had to be applied.

A further problem of the previously known coating method using soluble or vaporizable compounds of platinum metals arises because of the risk of allergic reactions of sensitive workers performing the coating. This risk required special precautions so that the coating method could be carried out in such a manner that industrial hygiene problems are avoided or at least reduced.

SUMMARY OF THE INVENTION

The object of the present invention is to provide a method for the production of catalytically active coatings for carrying out the BMA method which does not have the disadvantages of the previously known methods and which uses impregnating solutions. It is important that the method should not only be simpler, but also that it avoid risks for the workers. In order to reduce the cost of the method, the previously-required hydrogenation step of the impregnated and dried shaped article should be avoided and the method should be able to produce a range of coating thicknesses with a single coating step.

These and other objects are achieved in a method in which catalytically active coatings are formed on the surfaces of shaped articles consisting essentially of aluminum oxide. The coatings are useful for the production of hydrogen cyanide in accordance with the so-called BMA method. The catalytically active layer contains aluminum nitride and at least one platinum metal.

In accordance with method of the invention, the shaped articles are moistened uniformly, in a known manner, with a carrier liquid containing at least one platinum metal coating component and an aluminum coating component in an atomic ratio (Pt metals / Al) of 0.001 to 1 : 1, the carrier liquid is evaporated off and the shaped article coated in this manner is heated in the presence of nitrogen and/or ammonia slowly to 1000° to 1350° C. in order to convert the coating into the catalytically active state. To the extent required, the formation of the active layer is concluded at the BMA reaction temperature, using the gas mixture of hydrocarbon and ammonia which is conventional for the BMA method, during a short start-up time.

In the method of the invention, the surfaces of the shaped articles to be coated are moistened with a suspension containing, as coating components, particulate elementary platinum metal and particulate elementary aluminum with a particle diameter, in both instances, essentially less than 100 μm. The expression "essentially less than 100 μm+ means that a small quantity (a few percent) of the particles may have a diameter of more than 100 μm.

It has been assumed, according to the state of the art, that a uniform coating requires the use of an impregnating solution containing dissolved metal compounds and also a hydrogenation step. It was surprisingly found, in accordance with the invention, that the moistening of the shaped articles by means of a suspension containing the metals in elementary form is not only possible but also that catalytically active coatings can be produced without the hydrogenation step which previously was required. After the moistening of the shaped articles with the suspension, which is carried out in a known manner, and after the evaporation and drying, only the so-called "forming" is needed. Aluminum nitride forms during the forming step, which takes place during the slow heating of the coated shaped articles in the presence of nitrogen and/or ammonia and, to the extent required, comes to a conclusion during a short start-up time of the BMA method. In general, this occurs in less than one hour.

The heating time is essentially a function of the furnace used and of the qualities of the shaped articles; the heating at the BMA reaction temperature customarily lasts 2–20 hours, preferably 5–15 hours.

It was determined that the catalytically active coating contains, in addition to platinum metal and aluminum nitride, compounds such as e.g. Pt-Al, Pt-N-Al, Pt-O-Al and Pt-N compounds produced from the interaction of the substances present, that is, platinum metal, aluminum, ammonia and the aluminum oxide of the shaped article. These compounds are formed during the heating step and the start-up time. Therefore, although the catalytically active coatings contain at least one platinum metal, preferably platinum, and aluminum nitride, these substances are not necessarily solely or primarily responsible for the catalytic activity.

The metals contained in the suspension are present in elementary form and the particles essentially exhibit a diameter of essentially less than 100 μm, preferably less than 50 μm. It is understood that suspensions with the smallest possible particles are preferred; such suspensions are easier to manage because the particles settle more slowly.

Among the platinum metals, that is, Rh, Ru, Pd, Os, Ir and Pt, platinum is preferred. The platinum metals can be obtained in a simple manner and in finely divided elementary form, e.g. by reduction of solutions of their compounds. The so-called "blacks" of the platinum metals are used with special preference in the method of the invention. Platinum blacks are commercially available.

Finely distributed aluminum such as that used, e.g. for lithographic, electronic and painting applications is generally suitable. Finely divided aluminum is usually present in leaf shape; the diameter of the Al leaves is generally 5 to 50 μm, with a thickness of approximately 0.1 to 5 μm, preferably 0.1 to 1 μm. Such aluminum powders are commercially available in inert liquids e.g. as pastes and as suspensions which can be brushed on or sprayed on, the so-called aluminum bronzes. In addition to the elementary aluminum finely dispersed in an organic solvent or solvent mixture, which aluminum can be coated, e.g. with stearic acid, commercial Al bronzes and Al pastes frequently also contain organic polymeric binding agents and/or auxiliary agents for the specific application such as e.g. pyrogenic silicic acid as thixotroping agent in the Al bronzes or glass powder and/or oxide powder for improving the adhesion in Al pastes which can be burned in. When using such bronzes or pastes for carrying out the present invention, an expert in the art will check their suitability with a preliminary test.

Carrier liquids which can be used to produce the suspensions are liquids which are largely inert to the metal powders. The following are suitable: Organic solvents such as e.g. aliphatic and aromatic hydrocarbons, esters, ketones or alcohols and mixtures of such solvents. Solvents or mixtures with a boiling point or boiling range under 350° C., especially under 150° C., are well suited. Especially preferred carrier liquids are the lower alcohols and hydrocarbons. The suitability of water can be improved by using aluminum which has been rendered inert on its surface.

The concentration of solid in the suspension can vary within broad limits. The solid concentration, that is, the amount of the particles suspended in the carrier liquid—aluminum, platinum metal as well as other insoluble components stemming from the Al paste or Al bronze and/or purposely posely added such as e.g. glass frits—is less critical to the extent that the suspension exhibits the desired processing viscosity. In general, the suspensions contain 10 to 150 % by weight, preferably 30 to 130 and especially 50 to 100 % by weight metal powder relative to the carrier liquid.

It is possible to apply the amount of platinum metal and aluminum required for a high service life of the coated shaped article in a single step with a single coating process by adjusting the concentration of metal powder in the suspension. A content of less than 10 mg platinum metal per $cm^2$ of the catalytically active surface is completely adequate. A surface concentration of 0.1 to 5 mg Pt/$cm^2$, especially 0.5 to 2 mg/$cm^2$, is preferred.

The atomic ratio of platinum metal to aluminum in the suspension is 0.001 to 1 1; a ratio in the range of 0.01 to 0.5 1 is preferred. A Pt/Al ratio in the range of 0.01 to 0.1 : 1 is especially suitable. In addition to the components essential to the invention, the suspension can contain soluble and/or insoluble auxiliary aids in the carrier liquid in order e.g. to delay the sedimentation and/or adjust the processing viscosity as well as to improve the adhesion of the coating on the shaped article before and/or after the formation of the catalyst.

As has already been stated, it can be advantageous if the suspension contains polymeric organic paint binding agents. Potentially useful paint binding agents, which can be decomposed without leaving a residue during the forming of the catalyst, are e.g. polyacrylates, polymethacrylates, polyester resins, polyurethanes. Insofar as the suspension contains paint binding agents, it is possible to coat shaped articles such as BMA tubes in stock and to store them prior to the final forming of the catalyst. This can be very helpful in carrying out the manufacture of the catalysts. The auxiliary agents customary in the production of paint such as organic and-/or inorganic auxiliary running agents, sedimentation delayers and thixotroping agents such as e.g. pyrogenic silicic acid can also be used in an effective amount if it is assured by preliminary test that this will not bring about any adverse effects on the formation and the effectiveness of the catalyst.

It was determined that the effectiveness and the service life of the catalytically active coating are enhanced by the presence of adhesive oxides or their precursors or of metal compounds, especially in the form of oxides and/or silicates and/or borates in a composition capable of forming glass below 1000° C. and/or of glass frits with a hemisphere temperature below 1000° C. in the suspension. The named adhesive oxides or their precursors, or the metal compounds or glass frits are customarily present in an amount lower than that of the aluminum; an amount of 5 to 50 % by weight relative to aluminum is preferred.

The term "composition capable of forming glass below 1000° C." refers to a composition which contains oxides and/or precursors of oxides of one or more of the elements Si, B, Al, Ge, Zr, Ti together with one or more oxides or precursors of the oxides of the elements Pb, Sn, Sb, Bi, Mg, Ca, Sr, Ba, Li, Na, K, Mn, Fe, Co, Ni, Cu, Zn. Compositions are preferred which result essentially in borosilicate glasses. The presence of rather large amounts of alkali is less favorable since this would tend to have an adverse effect on the BMA synthesis. The previously-named metals can also be used in the form of their silicates and/or borates. Precursors of the oxides can be, in particular, oxide hydrates and organic compounds of the named metals such as e.g. alkoxy silanes and siloxanes or resinates of e.g. Pb and Sn.

Organic silicon compounds such as orthosilicic-acid esters, organosilanes with one to three hydrolyzable groups on the Si atom or the condensation products of the named monomeric silicon compounds are especially suitable as precursors of adhesive oxides which can be used alone. Orthosilicic-acid tetra($C_1$–$C_6$) alkyl esters and their condensation products are suitable. The named organosilanes contain one to three organo groups on the Si atom, preferably alkyl, aryl, cycloalkyl or alkenyl, which groups can also be substituted; the hydrolyzable groups are especially alkoxy, aryloxy or acyloxy. As organo-trialkoxysilanes, propyl-tri ($C_1$–$C_6$) alkoxysilanes are preferred, especially substituted in the 3-position of the propyl group, e.g., by Cl, $NH_2$, SH, alkoxy, epoxyalkyloxy, vinyloxy or methacryloxy. Condensation products of the named organosilanes can be built up from one or more of the named organosilanes as structural element and linked with each other by means of siloxane bonds. Among the condensation products, the ring-shaped or chain-shaped poly(diorganosiloxanes) and poly(organoalkoxysiloxanes) are especially suitable and $C_1$- to $C_8$- alkyl or phenyl are preferred as organo group and $C_1$- to $C_8$- alkoxy as the alkoxy group. Although the organic Si compounds were designated as precursor for adhesive oxides, it should not be excluded that they can also be optionally converted during the forming and/or the BMA operation into other compounds than $SiO_2$.

Instead of using the oxides or their precursors in a glass-forming composition, it is generally more advantageous to use the corresponding glass frits directly, in which instance lead borosilicate frits, especially those with a high lead content and/or Cu-containing lead borosilicate frits are preferred. Frits with a hemisphere temperature in the range of 400°–800° C. are especially preferred. (The term "hemisphere temperature" signifies that temperature at which a test sample, whose dimensions are $3 \times 3 \times 3$ mm, melts in such a manner that the radius of its base area is equal to its height.)

In addition to the elementary metals necessary for the production of the catalytically active coating, namely, at least one platinum metal and aluminum, the suspension can additionally contain one or more other catalytically active metals, or metal compounds which can be reduced in the BMA process to these metals. For example, metals from the group of nickel, copper alkaline earth metals and rare earths, which develop their catalytic action in the BMA process alone or, in the form of alloys with the platinum metal and/or aluminum, are catalytically active. Nickel and copper are preferred. Insofar as these metals are used in the form of metal compounds in the suspension, such metal compounds as, e.g., organic metal compounds, metal halides or metal oxides should be selected which are reduced to the metals during the BMA process, in which a reducing atmosphere prevails; these metals can also be entirely or partially converted by the presence of ammonia during the BMA process into the corresponding nitrides To the extent that such additional metals or metal compounds are also used, an expert in the art will determine the amount to be added by means of preliminary tests. The amount to be added, calculated as metal, is customarily below that of the aluminum contained in the suspension. An amount to be added in the range of 1 to 50 % by weight, especially 5 to 20 % by weight, relative to Al, is preferred.

In principle, the method of the invention can be used for the coating of different kinds of shaped articles such as pellets or tubes. However, in the BMA method, it is preferred to use reaction tubes whose catalytically active coating is located in the interior of the tubes. Thus, the method of the invention is particularly useful for coating the interiors of tubes manufactured essentially from alpha or gamma aluminum oxide. Depending on the manufacturing process, the tubes can also contain slight amounts of other oxides in addition to aluminum oxide.

The actual coating takes place in a known manner, manually or with the assistance of suitable coating devices, by means of impregnation or moistening of the surface to be coated with the suspension, followed by evaporation of the carrier liquid. In coating the interiors of tubes, the tubes can be filled with the suspension, e.g. in a horizontal or a slightly inclined position, and coated with the suspension while the tubes are rotated about the tube axis; after the removal of any excess suspension, the solvent is allowed to evaporate, e.g. by means of heating the tubes and/or reducing the pressure. Preheated tubes can also be brought in contact with the suspension. The solvent vapors produced during the drying of the moistened shaped articles, which can optionally also take place in the BMA reactor, can be condensed in a known manner and reused. Of course, a uniform moistening can also take place in the case of a vertical or inclined position of the tubes if care is taken that during the moistening of the inner wall, the solid concentration of the suspension is maintained over the tube length so that a uniform coating is obtained.

The coating apparatus described in U.S. Pat. No. 4,415,485 is also suitable for the present method.

After the moistening and drying of the shaped articles containing adhering metals and optional additives, these shaped articles are heated slowly, that is, over a period of several hours, in the BMA reactor in the presence of nitrogen, or preferably ammonia or mixtures of these gases, to the temperature customary for the BMA method in order to form the catalyst. It is assumed that an aluminum film containing platinum metal develops at first during the heating from which film the catalytically active coating develops during the further heating. If ammonia is used during the heating, the catalyst is effectively formed upon the attainment of the customary BMA reaction temperature of 1200 to 1350° C. If the heating is carried out in the presence of e.g. nitrogen or nitrogen-ammonia mixtures, the formation of the catalytically active coating at the BMA reaction temperature using the gas mixture of hydrocarbon and ammonia customary for the BMA method is concluded during a short start-up time—approximately 0.5 to 2 hours.

The advantage of the method of the invention resides in the avoidance of the previously-necessary hydrogenation step in the production of the catalytically active coating. The method also permits the production of a variety of coating thicknesses—e.g. expressed in mg platinum metal per cm² coating surface at a given atomic ratio of platinum metal to aluminum—in a single coating process. The health risk during the coating is considerably reduced because it is possible to use elementary platinum metal instead of soluble compounds.

DETAILED DESCRIPTION OF PREFERRED EMBODIMENTS

The invention is illustrated in the following examples.

EXAMPLE 1

A suspension of platinum black (firm Degussa AG) and of an aluminum paste (prod. No. 67900039 of the firm Demetron GmbH, Hanau) was prepared in an ethanol/xylene mixture as the carrier liquid. The Al paste contains approximately 50% by weight Al, approximately 30 % by weight Cu-containing lead borosilicate, a very small amount of a polymeric binding agent and xylene. The Pt/Al atomic ratio was 0.1 : 1. 1200 g aluminum paste and 400 g platinum black were suspended with an intensive agitator in 1 liter of ethanol.

In order to coat the interiors of several BMA tubes of alpha aluminum oxide—length of the tubes 210 cm, inner diameter 16 mm—an amount of the suspension corresponding to a) 7g, b) 5g, c) 3g solid substance was used per tube. The coating took place by means of a uniform distribution of the suspension in the tube while rotating the tube in an essentially horizontal position. After the evaporation of the solvent in air, the coated tubes were placed in the BMA furnace and heated in the presence of ammonia (10 moles/h per tube) to 1250° to 1300° C. within 13 hours. Subsequently, 31 moles/h ammonia and 29 moles/h methane were introduced per BMA reaction tube. Hydrogen cyanide developed in the tubes coated according to a), b) and c) at the beginning of the reaction, in high yield and without fouling the tubes. During a test period of 20 days, the HCN yield, relative to methane, in tube a) was approximately 85 %, in tube b) approximately 77 % and in tube c) approximately 85 %. There was no drop in performance in any of the tubes during the testing period.

EXAMPLE 2

A suspension was prepared in an analogous manner to Example 1 from 1200 g of the Al paste used in Example 1 and 200 g Pt black—Pt/Al atomic ratio 0.05: 1 —and 1 liter ethanol. In order to coat the interior of BMA tubes of $\alpha$-Al$_2$O$_3$ —length of the tubes 105 cm, inner diameter 16 mm — an amount of suspension corresponding to 2.8 g solid substance was used per tube; the Pt surface concentration was thus approximately 0.9 mg Pt/cm². After the evaporation of the solvent in air, the coated tubes were placed in the BMA furnace and heated in the presence of ammonia (1.05 moles/h) to 1250° to 1300° C. within 7 hours. Subsequently, 1.05 mole/h ammonia and 1 mole/h methane were added per BMA reaction tube. Hydrogen cyanide developed at the beginning of the reaction, in a high yield and without carbon black formation.

During the testing period of 14 days, the HCN yield, relative to methane, was approximately 91 %. There was no drop in performance in any of the tubes during the testing period.

EXAMPLE 3

BMA tubes according to Example 2 were coated in the manner described in Example 2 with an ethanolic suspension containing Pt and Al in an atomic ratio of 0.05 : 1 and 200 g Pt/liter ethanol. An Al paste (prod. No. 67900067 of Demetron GmbH, Hanau) was used which contained, in addition to Al, a Cu-containing lead borosilicate glass frit, polymeric binding agents and paint solvents. The HCN yield, relative to methane, at the start of the BMA process was 70% at a coating amount of 2.8 g solid per tube.

EXAMPLE 4

An ethanolic suspension was prepared from a commercial aluminum bronze containing 13% by weight paint binding agent and paint solvent but no glass frit or other metal compounds and from platinum black—Pt/Al atomic ratio 0.09: 1 , Pt concentration 200 g Pt/liter ethanol. After the coating of BMA tubes with an amount corresponding to approximately 1 mg Pt/cm² and the forming of the catalyst according to Example 2, HCN was obtained at the start of the BMA process in a yield which was moderate at first but increased during the operation.

EXAMPLE 5

Composition of the suspension 3.0 g aluminum (spattered, without coating)
2.0 g Pt black
0.90 g polymethyl-/butyl-methacrylate
2.82 g polyphenylethylsiloxane, degree of polymerization approximately 4
1.35 g xylene
2.65 g ethanol
Atomic ratio: Pt/Al equal to 0.1 : 1
Coating type: By hand according to Example 1
Shaped article: $\alpha$-Al$_2$O$_3$ tubes according to Example 2 (length =105 cm, inner diameter =16 mm)
Amount applied: 2.4 mg Pt/cm²
Forming: Heating in 7 hours to 1250° C. in the presence of 1.05 mole/h ammonia
HCN synthesis: 1250° C., 1.05 mole/h NH$_3$ and 1.0 mole/h CH$_4$—operating time 10 days
HCN yield: 96 % relative to methane

EXAMPLE 6

Composition of the suspension 10.0 g aluminum powder: average particle diameter 11 $\mu$m, platelet-shaped, coated with 1 % stearic acid
7.23 g Pt black
3.54 g polyphenylethylsiloxane, n=approx. 4
0.3 g pyrogenic silicic acid with a BET$_{(N2)}$ surface area of 300 m²/g
10.16 g polymethyl/butylmethacrylate
40 ml toluene
Atomic ratio: Pt/Al equal to 0.1 : 1
Coating type: with coating apparatus according to U.S. Pat. No. 4,415,485, receiver with suspension agitated
Shaped article: BMA tubes according to Example 1 length =210 cm, inner diameter =16 mm $\alpha$-Al$_2$O$_3$
Amount applied: 0.4 mg Pt/cm²
Forming: heating in 10 hours to 1250° C. in the presence of 10 moles/h NH$_3$ HCN synthesis: 1250° C. 31 moles/h NH₃ and 30 moles/h CH₄ operating time 15 days
HCN yield: 82 % relative to methane

EXAMPLE 7

Composition of the suspension 0.34 g Al powder (as used in Example 6)
0.25 g Pt black
0.12 g 3-aminopropyltriethoxysilane
0.01 g Pyrogenic Al₂O₃ 0.35 g polymethyl-/butyl methacrylate
2 ml Toluene
Atomic ratio: Pt/Al equal to 0.1 : 1
Amount applied: 0.4 mg Pt/cm²
BMA tube: length=105 cm
Forming and BMA synthesis as in Example 5
HCN yield: 60 % (furnace-conditioned operating disturbance)

EXAMPLE 8

Composition of the suspension 200 g Al powder (as in Example 6)
144.6 g Pt black
78.8 g polysiloxane (as in Example 6)
3.0 g pyrogenic silicic acid (as in Example 6)
101.6 g polymethyl-/butyl-methacrylate
1000 ml toluene
Atomic ratio: Pt/Al equal to 0.1 : 1
Amount applied: 1.5 mg Pt.m²
Forming and BMA operation according to Example 6
HCN yield: 90 % relative to CH₄

What is claimed is:

1. A method for the production of catalytically active coatings on the surfaces of shaped articles consisting essentially of aluminum oxide, said coatings being useful for the production of hydrogen cyanide according to the BMA method, in which the catalytically active layer contains aluminum nitride and at least one platinum metal and in which the shaped articles are moistened uniformly with a carrier liquid containing at least one platinum metal coating component and an aluminum coating component in an atomic ratio (Pt metals / Al) of 0.001 to 1 : 1, the carrier liquid is evaporated off and the shaped article is heated in the presence of nitrogen and/or ammonia slowly to 1000° to 1350° C. in order to convert the coating into the catalytically active state and, to the extent required, the forming is concluded at the BMA reaction temperature using the gas mixture of hydrocarbon and ammonia customary for the BMA method during a short start-up time;
the improvement in which the carrier liquid containing at least one platinum metal coating component and an aluminum coating component is a suspension containing particulate elementary platinum metal and particulate elementary aluminum with a particle diameter, in both instances, essentially less than 100 μm.

2. A method as set forth in claim 1, in which an organic solvent or mixture of organic solvents, which is inert towards the metal powders, is used as the carrier liquid.

3. A method as set forth in claim 2 in which the carrier liquid is selected from the group consisting of aliphatic and aromatic hydrocarbons, esters, ketones, ethers, alcohols and mixtures of such solvents.

4. A method as set forth in claim 1 in which the suspension contains platinum as platinum metal and the atomic ratio of platinum to aluminum is 0.01 to 0.5 : 1.

5. A method as set forth in claim 4 in which the atomic ratio of platinum to aluminum is 0.01 to 0.1 : 1.

6. A method as set forth in claim 1 in which the suspension contains 10 to 150% by weight metal powder relative to the carrier liquid.

7. A method as set forth in claim 6 in which the suspension contains 30 to 130% by weight metal powder relative to the carrier liquid.

8. A method as set forth in claim 7 in which the suspension contains 50 to 100% by weight metal powder relative to the carrier liquid.

9. A method as set forth in claim 1 in which the suspended platinum metal particles and aluminum particles have a particle diameter below 50 μm.

10. A method as set forth in claim 1 in which the suspension contains an adhesive oxide or precursor of an adhesive oxide.

11. A method as set forth in claim 10 in which the suspension contains, as precursor of an adhesive oxide, an organic silicon compound selected from the group consisting of monomeric orthosilicic-acid esters, monomeric organosilanes having one to three hydrolyzable groups on the Si atom, and condensation products of said monomeric silicon compounds.

12. A method as set forth in claim 11 in which the precursor is a member of the group consisting of trialkoxysilanes, poly(di-organosiloxanes) and poly(organoalkoxysiloxanes).

13. A method as set forth in claim 1 in which the suspension contains a glass frit having a hemisphere temperature below 1000° C. or a metal compound in a composition capable of forming glass at a temperature below 1000° C.

14. A method as set forth in claim 13 in which the metal compound is selected from the group consisting of oxides, silicates and borates.

15. A method as set forth in claim 13 in which the suspension contains a glass frit having a hemisphere temperature below 1000° C.

16. A method according to claim 13 in which the metal compound and/or glass frit is present in an amount below that of the metallic aluminum.

17. A method as set forth in claim 16 in which the amount of metal compound and/or glass frit is 5 to 50 % by weight of the aluminum.

18. A method a set forth in claim 1 in which suspension additionally contains an organic polymeric binding agent.

19. A method as set forth in claim 18 in which the organic polymeric binding agent is a polymethacrylate.

20. A method as set forth in claim 1 in which the suspension additionally contains one or more finely distributed metals or metal compounds of the group consisting of nickel, copper, alkaline earth metals and rare earths.

21. A method as set forth in claim 20 in which the additional metal is Ni and/or Mg.

22. A method as set forth in claim 1 in which the amount of platinum metal applied onto the surface of the shaped article with the suspension results in a surface concentration of below 10 mg/cm².

23. A method as set forth in claim 22 in which the amount of platinum metal applied onto the surface of the shaped article with the suspension results in a surface concentration of 0.1 to 5 mg/cm².

24. A method as set forth in claim 23 in which the amount of platinum metal applied onto the surface of the shaped article with the suspension results in a surface concentration of 0.5 to 2 mg/cm².

25. A method as set forth in claim 1 in which the platinum metal is selected from the group consisting of Rh, Ru, Pd, Os, Ir and Pt.

26. A method as set forth in claim 25 in which the platinum metal is platinum.

* * * * *

UNITED STATES PATENT AND TRADEMARK OFFICE
CERTIFICATE OF CORRECTION

PATENT NO. : 5,039,643

DATED : August 13, 1991

INVENTOR(S) : Hecht et al

It is certified that error appears in the above-identified patent and that said Letters Patent is hereby corrected as shown below:

In Column 4 line 31 change "0.51 is preferred" to

--0.5:1 is preferred.--

Signed and Sealed this

Ninth Day of February, 1993

Attest:

STEPHEN G. KUNIN

*Attesting Officer*  Acting Commissioner of Patents and Trademarks